US009336088B2

(12) United States Patent
Shim

(10) Patent No.: US 9,336,088 B2
(45) Date of Patent: May 10, 2016

(54) METHOD AND APPARATUS FOR MANAGING AND VERIFYING CAR TRAVELING INFORMATION, AND SYSTEM USING THE SAME

(71) Applicant: CORE LOGIC INC., Seoul (KR)

(72) Inventor: Min-Sik Shim, Seoul (KR)

(73) Assignee: CORE LOGIC INC., Seoul (KR)

( * ) Notice: Subject to any disclaimer, the term of this patent is extended or adjusted under 35 U.S.C. 154(b) by 223 days.

(21) Appl. No.: 13/902,416

(22) Filed: May 24, 2013

(65) Prior Publication Data

US 2013/0325815 A1 Dec. 5, 2013

(30) Foreign Application Priority Data

May 31, 2012 (KR) .................. 10-2012-0058180

(51) Int. Cl.
*G06F 17/30* (2006.01)
*G06F 11/14* (2006.01)
*G06F 21/64* (2013.01)

(52) U.S. Cl.
CPC ............ *G06F 11/1435* (2013.01); *G06F 21/64* (2013.01); *G06F 2221/2101* (2013.01)

(58) Field of Classification Search
USPC ......................................... 707/687, 758, 803
See application file for complete search history.

(56) References Cited

U.S. PATENT DOCUMENTS

| 6,246,967 | B1* | 6/2001 | Libicki ................. G01G 19/02 177/25.11 |
| 7,308,577 | B2* | 12/2007 | Wakao ..................... G06T 1/00 380/200 |
| 7,673,264 | B1* | 3/2010 | Darbinyan .......... G06F 17/5022 716/106 |
| 7,783,071 | B2* | 8/2010 | Ono ..................... H04N 1/2112 348/207.99 |
| 8,244,104 | B2* | 8/2012 | Kashiwa ...................... 386/285 |
| 2004/0025093 | A1* | 2/2004 | Willy .................. G06F 11/3676 714/54 |
| 2004/0078581 | A1* | 4/2004 | Dublish et al. ................ 713/189 |
| 2005/0038580 | A1* | 2/2005 | Seim et al. ...................... 701/29 |
| 2006/0055512 | A1* | 3/2006 | Chew ................. G06K 9/00885 340/5.82 |
| 2007/0067645 | A1* | 3/2007 | Dublish et al. ................ 713/189 |
| 2007/0107046 | A1* | 5/2007 | Jaeger ..................... G06F 21/57 726/4 |
| 2007/0248244 | A1* | 10/2007 | Sato .................. G06F 17/30265 382/103 |

(Continued)

FOREIGN PATENT DOCUMENTS

JP 11115831 A 4/1999
KR 20110023412 A 3/2011

(Continued)

OTHER PUBLICATIONS

Korean Notice of Allowance dated Aug. 28, 2014.

*Primary Examiner* — Hanh Thai
(74) *Attorney, Agent, or Firm* — Hauptman Ham, LLP

(57) ABSTRACT

The present disclosure provides a method and apparatus for managing and verifying car traveling information, and a system using the same. The method for managing car traveling information includes receiving traveling image data and traveling record data; extracting computation data for integrity computation from at least one of the traveling image data and the traveling record data; generating integrity verification data by computing predetermined identification number data and the computation data; and generating integrity traveling data by combining the traveling image data, the traveling record data and the integrity verification data. In this way, integrity of an image from a black box for cars can be easily verified while maintaining an original copy of the image and related traveling record data.

11 Claims, 4 Drawing Sheets

(56) References Cited

U.S. PATENT DOCUMENTS

| | | | |
|---|---|---|---|
| 2008/0199155 A1* | 8/2008 | Hagens et al. | 386/124 |
| 2008/0300775 A1* | 12/2008 | Habaguchi | G08G 1/096716 701/116 |
| 2009/0033510 A1* | 2/2009 | Izumi | G06F 21/445 340/679 |
| 2009/0089860 A1* | 4/2009 | Forrester et al. | 726/3 |
| 2010/0090839 A1* | 4/2010 | Omi | B60K 28/04 340/575 |
| 2011/0078459 A1* | 3/2011 | Yoshioka | H04N 5/77 713/189 |
| 2011/0087893 A1* | 4/2011 | Kim | G06F 21/64 713/189 |
| 2011/0243379 A1* | 10/2011 | Miyajima | G01C 21/28 382/103 |
| 2012/0078864 A1* | 3/2012 | Li | H04N 21/8358 707/702 |
| 2012/0110346 A1* | 5/2012 | Resch | 713/189 |
| 2012/0291094 A9* | 11/2012 | Forrester et al. | 726/3 |
| 2012/0331499 A1* | 12/2012 | Hagens et al. | 725/25 |
| 2013/0197790 A1* | 8/2013 | Ouali | G08G 1/0133 701/118 |

FOREIGN PATENT DOCUMENTS

| | | |
|---|---|---|
| KR | 20110040556 A | 4/2011 |
| KR | 101105205 B1 | 1/2012 |

\* cited by examiner

METHOD AND APPARATUS FOR MANAGING AND VERIFYING CAR TRAVELING INFORMATION, AND SYSTEM USING THE SAME

CROSS-REFERENCE TO RELATED APPLICATION

This application claims priority to Korean Patent Application No. 10-2012-0058180 filed on 31 May, 2012, and all the benefits accruing therefrom under 35 U.S.C. §119, the contents of which is incorporated by reference in its entirety.

BACKGROUND

1. Technical Field

The present invention relates to a method and apparatus for managing and verifying car traveling information, and a system using the same.

2. Description of the Related Art

A black box has conventionally referred to a flight data recorder (FDR) or an airborne video recorder (AVR). Such a black box records flight altitude and speed, computing state, sound of a control room, communication with a control tower, etc. of an airplane in flight, and is thus used to investigate a cause of an air accident and reenact an accident.

However, a black box for cars, i.e., a digital video recorder (DVR) for a car, has attracted attention and research and development thereof has increased with rapid rise in the number of automobiles and rapid increase in car accidents.

An image recorded by the black box for cars is used as evidence in a car accident. To this end, image integrity must be guaranteed. If the image is contaminated or damaged for some reason, it is not admissible as evidence.

In general, a symbol or signature having a certain pattern such as a watermark is embedded into the image to confirm deterioration and damage of the image. However, the method of embedding a watermark is not suitable for an image of the black box for cars since the image of the black box includes traveling information, such as car collision and position information, in addition to typical image data.

Therefore, there is a need for a technique capable of determining deterioration and damage in images of the black box for cars while maintaining the images and data contained in the images.

BRIEF SUMMARY

One aspect of the present invention is to provide a method and apparatus for managing and verifying car traveling information, and a system using the same, which can easily verify integrity of an image and related traveling record data from a black box for cars while maintaining an original copy of the image and the related traveling record data.

Another aspect of the present invention is to provide a method and apparatus for managing and verifying car traveling information, and a system using the same, which can improve reliability of verifying integrity of an image and related traveling record data from a black box for cars based on a data extraction pattern and an identification number.

In accordance with one aspect of the present invention, a method of managing car traveling information includes: receiving traveling image data and traveling record data; extracting computation data for integrity computation from at least one of the traveling image data and the traveling record data; generating integrity verification data by computing predetermined identification number data and the computation data; and generating integrity traveling data by combining the traveling image data, the traveling record data and the integrity verification data.

In accordance with another aspect of the present invention, an apparatus for managing car traveling information includes: an input unit which receives traveling image data and traveling record data; a computation data extractor which extracts computation data for integrity computation from at least one of the traveling image data and the traveling record data; a computation unit which generates integrity verification data by computing predetermined identification number data and the computation data; and an integrity traveling data generator which generates integrity traveling data by combining the traveling image data, the traveling record data and the integrity verification data.

In accordance with a further aspect of the present invention, a method of verifying car traveling information includes: receiving integrity traveling data including traveling image data, traveling record data and integrity verification data; extracting computation data for integrity computation from at least one of the traveling image data and the traveling record data; generating integrity check data by computing predetermined identification number data and the computation data; and verifying integrity of the integrity traveling data by comparing the integrity check data with the integrity verification data.

In accordance with yet another aspect of the present invention, an apparatus for verifying car traveling information includes: an input unit which receives integrity traveling data including traveling image data, traveling record data and integrity verification data; a computation data extractor which extracts computation data for integrity computation from at least one of the traveling image data and the traveling record data; a computation unit which generates integrity check data by computing predetermined identification number data and the computation data; and an integrity verifier which verifies integrity of the integrity traveling data by comparing the integrity check data with the integrity verification data.

In accordance with yet another aspect of the present invention, a system for managing car traveling information includes: an apparatus for managing car traveling information, which receives traveling image data and traveling record data; extracts first computation data for integrity computation from at least one of the traveling image data and the traveling record data; generates integrity verification data by computing predetermined identification number data and the computation data; and generates integrity traveling data by combining the traveling image data, the traveling record data and the integrity verification data, and an apparatus for verifying car traveling information, which receives integrity traveling data including traveling image data, traveling record data and integrity verification data; extracts second computation data for integrity computation from at least one of the traveling image data and the traveling record data; generates integrity check data by computing predetermined identification number data and the second computation data; and verifies integrity of the integrity traveling data by comparing the integrity check data with the integrity verification data.

The present invention is not limited to the above aspects, and other aspects, objects, features and advantages of the present invention will be understood from the detailed description of the following embodiments of the present invention. In addition, it will be readily understood that the aspects, objects, features and advantages of the present invention can be achieved by the accompanied claims and equivalents thereof.

BRIEF DESCRIPTION OF THE DRAWINGS

The above and other aspects, features, and advantages of the present invention will become apparent from the detailed description of the following embodiments in conjunction with the accompanying drawings, in which.

DETAILED DESCRIPTION

Figure 1:
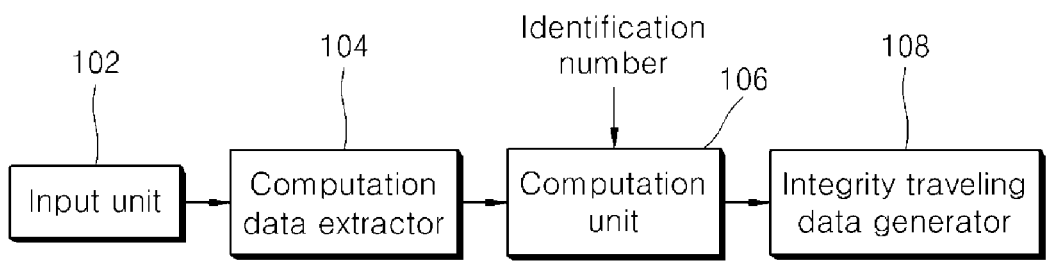
FIG. 1 is a block diagram of an apparatus for managing car traveling information according to one embodiment of the present invention.

Exemplary embodiments of the present invention will now be described in detail with reference to the accompanying drawings. It should be understood that the present invention is not limited to the following embodiments and may be embodied in different ways, and that the embodiments are given to provide complete disclosure of the invention and to provide thorough understanding of the invention to those skilled in the art. Descriptions of details apparent to those skilled in the art will be omitted for clarity of description. The same components will be denoted by the same reference numerals throughout the specification.

FIG. 1 is a block diagram of an apparatus for managing car traveling information according to one embodiment of the present invention.

Referring to FIG. 1, the apparatus for managing car traveling information according to one embodiment includes an input unit 102, a computation data extractor 104, a computation unit 106, and an integrity traveling data generator 108.

The input unit 102 receives traveling image data and traveling record data from various devices in a car. For example, the input unit 102 may receive the traveling image data (video/audio) from a camera, and receive the traveling record data such as position information or collision information of the car.

Here, the traveling record data may include at least one among traveling speed data, traveling time data, traveling position data, collision data, user data, and car data. For example, the traveling position data may be obtained by a global navigation satellite system (GNSS) such as a global positioning system (GPS) provided in a car, and the collision data may be obtained by a shock sensor such as a G-sensor. Also, the user data means information about a driver previously input to a car, and the car data means various data about the car, which are input to the car by a manufacturer.

In another embodiment, the apparatus may further include an encoder (not shown) which encodes the traveling image data. In this case, the traveling image data received by the input unit 102 may be data in the form of a bitstream encoded by the encoder.

The computation data extractor 104 extracts computation data for integrity computation from at least one of the traveling image data and the traveling record data received through the input unit 102. Here, the computation data refers to data to be used in generating data for integrity verification by the computation unit 106 described below.

The computation data extractor 104 may select one among a plurality of data extraction patterns, and extract the computation data in accordance with the selected data extraction pattern. Here, the plurality of data extraction patterns includes a pattern for selecting only specific data among input data, a pattern for extracting only the data of certain order from the selected data, or a combination thereof. For example, in one embodiment, the computation data extractor 104 may select only certain data such as video frame data of the traveling image data input as the computation data, and may select both video frame data and time data. In addition, the computation data extractor 104 may select odd-numbered or even-numbered data of the selected certain data frame as the computation data. Further, the computation data extractor 104 may generate a random number corresponding to a seed number based on a time point upon extraction, and select the computation data according to order by the random number.

Such a data extraction pattern may be selected according to a previously stored selection algorithm, or may be previously designated by user's external input. Thus, the present invention has an advantage of increasing an integrity degree of car traveling information through various data extraction patterns. In particular, a conventional method has a disadvantage of increasing computational load beyond what is necessary if both the traveling image data and the traveling record data are all used. On the other hand, according to the present invention, a certain data is extracted from the traveling image data or the traveling record data and is used for computation, thereby decreasing computational load while increasing processing speed.

The computation unit 106 generates the integrity verification data by computing the computation data extracted by the computation data extractor 104 and the predetermined identification number data. Here, the identification number (ID Number) data refer to data which may be given to corresponding apparatuses for managing car traveling information and may be previously set and stored in the apparatuses.

Thus, the present invention uses the data extraction pattern and the identification number data to generate the integrity verification data, thereby increasing the integrity degree, improving reliability of a process for generating the integrity verification data, and preventing the traveling information from being deteriorated or damaged.

The integrity traveling data generator 108 generates integrity traveling data by combining the traveling image data, the traveling record data and the integrity verification data. In the generated integrity traveling data, an original copy of the traveling image data and the traveling record data is maintained as it is, and the integrity verification data is added to verify the integrity of the corresponding data. Although not shown in FIG. 1, the apparatus according to the embodiment may further include a storage unit to store the generated integrity traveling data.

Figure 2:
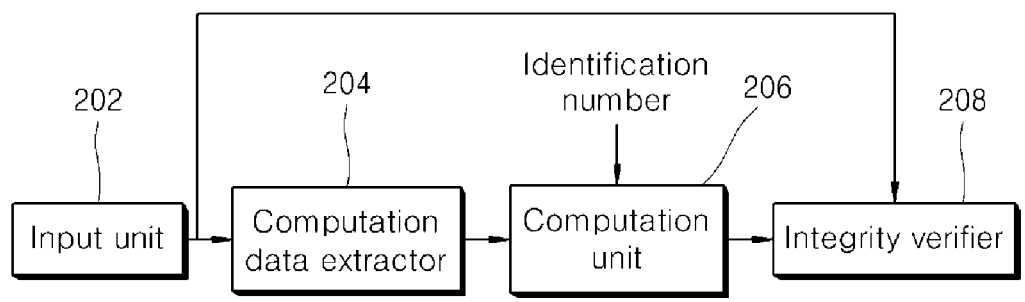
FIG. 2 is a block diagram of an apparatus for verifying car traveling information according to one embodiment of the present invention.

FIG. 2 is a block diagram of an apparatus for verifying car traveling information according to one embodiment of the present invention.

Referring to FIG. 2, the apparatus for managing car traveling information according to this embodiment includes an input unit 202, a computation data extractor 204, a computation unit 206, and an integrity verifier 208.

The input unit 202 receives integrity traveling data including traveling image data, traveling record data and integrity verification data, which are generated by the apparatus for managing car traveling information, as described above.

Further, the computation data extractor 204 extracts the computation data for computing integrity from at least one of the traveling image data and the traveling record data. Here, to verify the integrity, the computation data extractor 204 selects one data extraction pattern among the plurality of data extraction patterns and extracts the same computation data according to the selected data extraction pattern as in the computation data extractor 104 included in the apparatus for managing car traveling information, as shown in FIG. 1.

The computation unit 206 computes the extracted computation data and the identification number data and thus generates integrity check data for verifying the integrity. To this end, the computation unit 206 uses the same identification number data as the identification number data input to the computation unit 106 included in the apparatus for managing car traveling information as shown in FIG. 1, thereby verifying the integrity.

The integrity verifier 208 compares the integrity check data generated by the computation unit 206 with the integrity verification data included in the integrity traveling data, thereby verifying the integrity of the received integrity traveling data. The integrity verifier 208 guarantees the integrity of the corresponding traveling data only when the integrity check data and the integrity verification data are the same as those of the comparison result.

Figure 3:
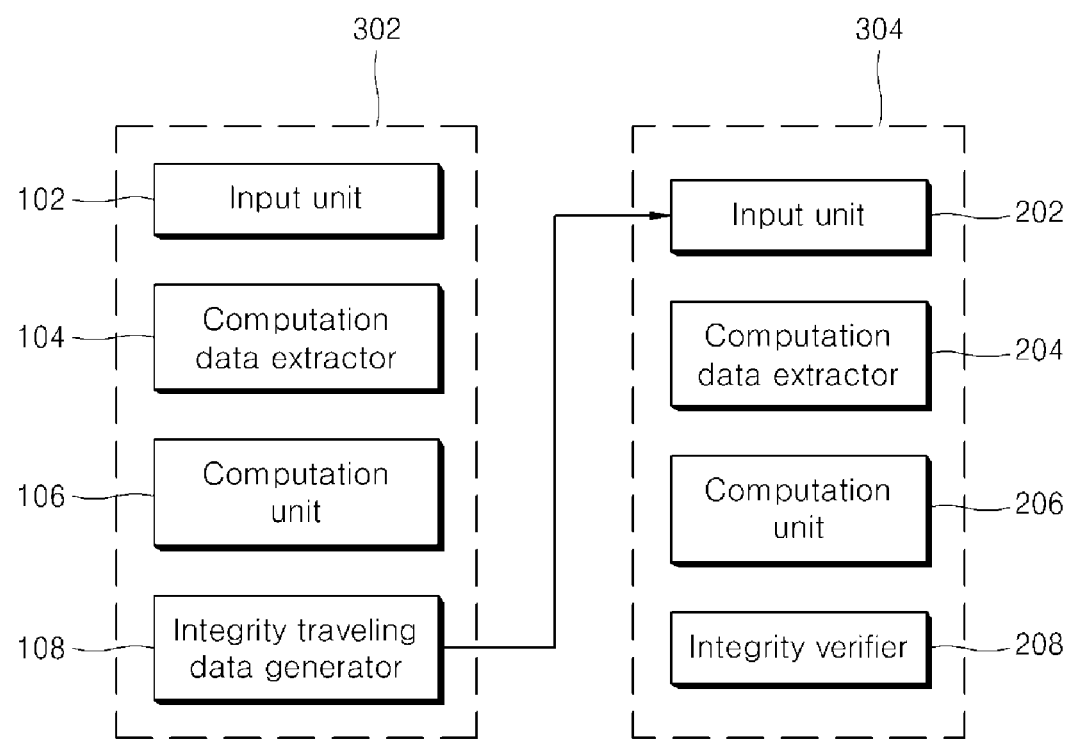
FIG. 3 is a block diagram of a system for managing car traveling information according to one embodiment of the present invention.

FIG. 3 is a block diagram of a system for managing car traveling information according to one embodiment of the present invention.

Referring to FIG. 3, the apparatus 302 for managing car traveling information and the apparatus 304 for verifying car traveling information may constitute one system. For example, a car is provided with a black box including the apparatus 302 for managing car traveling information, which records user traveling information. Further, the apparatus 302 for managing traveling information outputs integrity traveling data including the aforementioned integrity verification data in an accident, and the output data is transmitted to the apparatus 304 for verifying car traveling information through various data storage or transmission media.

The apparatus 304 for verifying car traveling information included in a reproducer, such as a computer or other devices, which can reproduce a general image, determines whether the traveling image data included in the integrity traveling data is deteriorated and damaged upon reproduction of the corresponding data, through the integrity verification process described above, and informs a user of the determination result.

Figure 4:
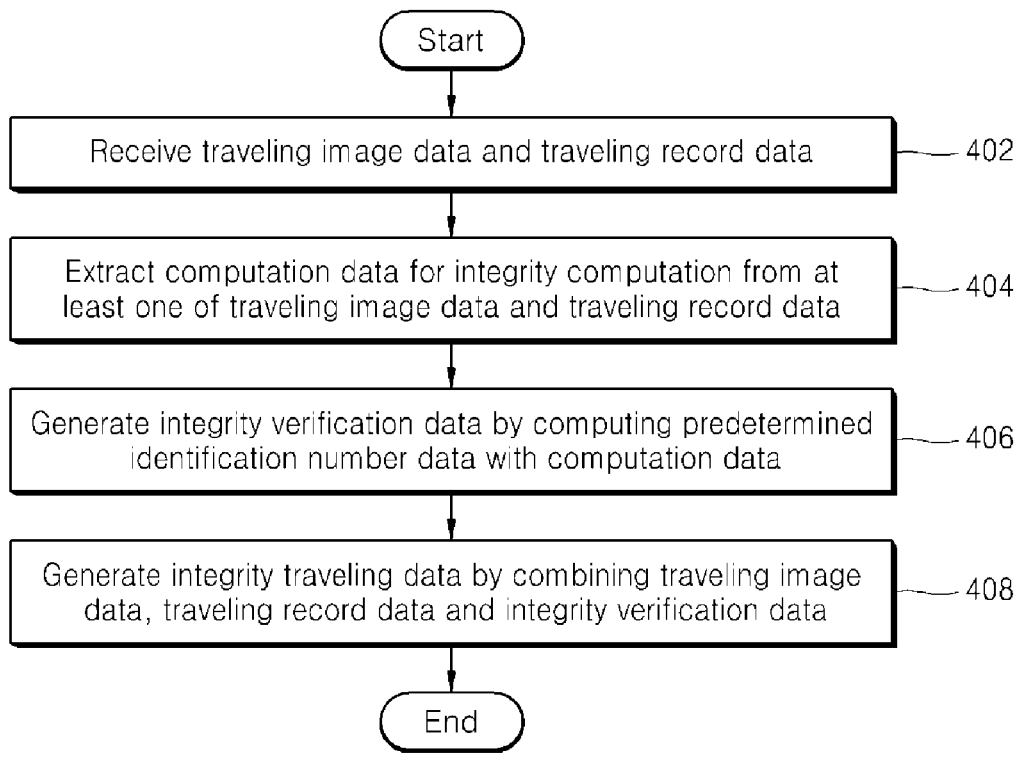
FIG. 4 is a flowchart of a method of managing car traveling information according to one embodiment of the present invention.

FIG. 4 is a flowchart of a method of managing car traveling information according to one embodiment of the present invention.

First, traveling image data and traveling record data are received (402). Here, the traveling record data may include at least one among traveling speed data, traveling time data, traveling position data, collision data, user data, and car data.

Next, computation data for integrity computation is extracted from at least one of the received traveling image data and the received traveling record data (404). Here, operation 404 of extracting the computation data may include selecting one among a plurality of data extraction patterns and extracting the computation data according to the selected data extraction pattern.

Next, predetermined identification number data and the computation data are computed to generate integrity verification data (406). Then, the traveling image data, the traveling record data and the integrity verification data are combined to generate integrity traveling data (408).

Figure 5:
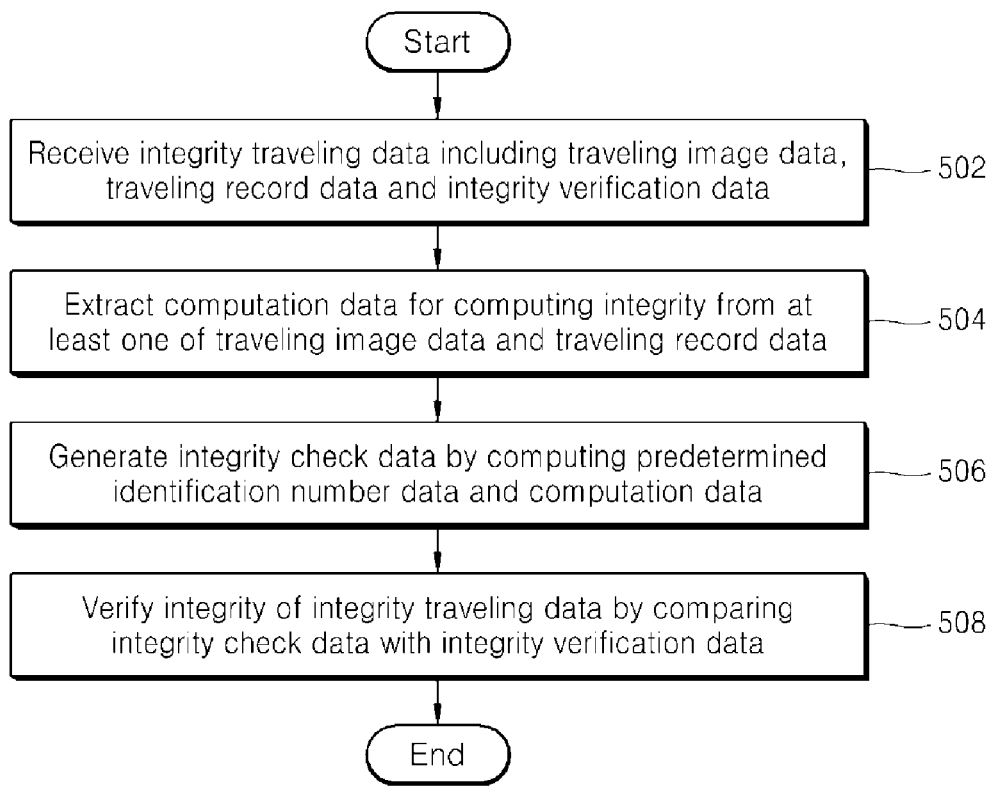
FIG. 5 is a flowchart of a method of verifying car traveling information according to one embodiment of the present invention.

FIG. 5 is a flowchart of a method of verifying car traveling information according to one embodiment of the present invention.

First, the integrity traveling data including the traveling image data, the traveling record data and the integrity verification data is received (502). Here, the traveling record data may include at least one among traveling speed data, traveling time data, traveling position data, collision data, user data, and car data.

Next, the computation data for integrity computation is extracted from at least one of the traveling image data and the traveling record data (504). Here, operation 504 of extracting the computation data may include selecting one among the plurality of data extraction patterns and extracting the computation data according to the data extraction patterns.

Next, the predetermined identification number data and the computation data are computed to generate integrity check data (506). Then, the generated integrity check data and the integrity verification data are compared to verify the integrity of the integrity traveling data (508).

As described above, the present invention has an advantage of easily verifying integrity of an image from a black box for cars while maintaining an original copy of the image and related traveling record data.

In addition, the present invention has an advantage of improving reliability in verification of integrity of an image from a black box for cars and related traveling record data through data extraction patterns and identification number.

Although some exemplary embodiments have been described herein, it should be understood by those skilled in the art that these embodiments are given by way of illustration only, and that various modifications, variations and alterations can be made without departing from the spirit and scope of the invention. The scope of the present invention should be defined by the appended claims and equivalents thereof.

What is claimed is:

1. A method for verifying integrity of traveling image data and related traveling record data from a black box for cars, the method performed by a car traveling information management apparatus including a processor and comprising:
   receiving the traveling image data and the traveling record data from the black box;
   extracting computation data for integrity computation from a certain data extracted from the traveling image data or the traveling record data;
   generating integrity verification data for verifying integrity of the traveling image data and the traveling record data based on predetermined identification number data and the computation data; and
   generating integrity traveling data by combining the traveling image data, the traveling record data and the integrity verification data, and
   the extracting the computation data comprises:
   selecting one data extraction pattern among a plurality of data extraction patterns; and
   extracting the computation data according to the selected data extraction pattern.

2. The method according to claim 1, wherein the traveling record data comprises at least one of traveling speed data, traveling time data, traveling position data, collision data, user data and car data.

3. The method according to claim 1, wherein the traveling image data includes video and/or audio data.

4. The method according to claim 3, wherein the computation data is extracted from at least one of the video data of traveling image data and time data of traveling record data.

5. An apparatus for verifying integrity of traveling image data and related traveling record data from a black box for a car, the apparatus comprising a processor, wherein said processor comprises:
- an input unit configured to receive the traveling image data and the traveling record data from the black box;
- a computation data extractor configured to extract computation data for integrity computation from a certain data extracted from the traveling image data or the traveling record data;
- a computation unit configured to generate integrity verification data for verifying integrity of the traveling image data and the traveling record data based on predetermined identification number data and the computation data; and
- an integrity traveling data generator configured to generate integrity traveling data by combining the traveling image data, the traveling record data and the integrity verification data and
- the computation data extractor is configured to select one data extraction pattern among a plurality of data extraction patterns, and to extract the computation data according to the selected data extraction pattern.

6. The apparatus according to claim 5, wherein the traveling record data comprises at least one of traveling speed data, traveling time data, traveling position data, collision data, user data and car data.

7. A method for verifying integrity of traveling image data and related traveling record data from a black box for a car, the method performed by a car traveling information management apparatus including a processor and comprising:
- receiving, from the black box, integrity traveling data comprising the traveling image data, the traveling record data and integrity verification data;
- extracting computation data for integrity computation from a certain data extracted from the traveling image data or the traveling record data;
- generating integrity check data based on predetermined identification number data and the computation data; and
- verifying integrity of the integrity traveling data by comparing the integrity check data with the integrity verification data, and
- wherein the extracting the computation data comprises:
- selecting one data extraction pattern among a plurality of data extraction patterns; and
- extracting the computation data according to the selected data extraction pattern.

8. The method according to claim 7, wherein the traveling record data comprises at least one of traveling speed data, traveling time data, traveling position data, collision data, user data and car data.

9. An apparatus for verifying integrity of traveling image data and related traveling record data from a black box for a car, the apparatus comprising a processor, wherein said processor comprises:
- an input unit configured to receive integrity traveling data including the traveling image data, the traveling record data and integrity verification data from the black box;
- a computation data extractor configured to extract computation data for integrity computation from a certain data extracted from the traveling image data or the traveling record data;
- a computation unit configured to generate integrity check data based on predetermined identification number data and the computation data; and
- an integrity verifier configured to verify integrity of the integrity traveling data by comparing the integrity check data with the integrity verification data, and
- the computation data extractor is configured to select one data extraction pattern among a plurality of data extraction patterns, and to extract the computation data according to the selected data extraction pattern.

10. The apparatus according to claim 9, wherein the traveling record data comprises at least one of traveling speed data, traveling time data, traveling position data, collision data, user data and car data.

11. A system for verifying integrity of traveling image data and related traveling record data from a black box for a car, the system comprising:
- a first apparatus for generating integrity traveling data, said first apparatus comprising a first processor configured
- to receive the traveling image data and the traveling record data from the black box,
- to extract first computation data for integrity computation from a certain data extracted from the traveling image data or the traveling record data,
- to generate integrity verification data based on predetermined identification number data and the first computation data, and
- to generate the integrity traveling data by combining the traveling image data, the traveling record data and the integrity verification data; and
- a second apparatus for verifying integrity of the integrity traveling image data, said second apparatus comprising a second processor configured
- to receive, from the first apparatus, the integrity traveling data including the traveling image data, the traveling record data and the integrity verification data,
- to extract second computation data for integrity computation from a certain data extracted from the traveling image data or the traveling record data,
- to generate integrity check data based on the predetermined identification number data and the second computation data, and
- to verify integrity of the integrity traveling data by comparing the integrity check data with the integrity verification data.

* * * * *